US012603892B2

(12) United States Patent
Tang

(10) Patent No.: US 12,603,892 B2
(45) Date of Patent: Apr. 14, 2026

(54) GLOBAL MAPPING TO INTERNAL APPLICATIONS

(71) Applicant: Akamai Technologies, Inc., Cambridge, MA (US)

(72) Inventor: David Tang, Cambridge, MA (US)

(73) Assignee: Akamai Technologies, Inc., Cambridge, MA (US)

( * ) Notice: Subject to any disclaimer, the term of this patent is extended or adjusted under 35 U.S.C. 154(b) by 126 days.

(21) Appl. No.: 18/236,454

(22) Filed: Aug. 22, 2023

(65) Prior Publication Data

US 2025/0071120 A1     Feb. 27, 2025

(51) Int. Cl.
    *H04L 9/40*        (2022.01)
    *H04L 43/10*       (2022.01)
    *H04L 67/141*      (2022.01)

(52) U.S. Cl.
    CPC ............ *H04L 63/107* (2013.01); *H04L 43/10* (2013.01); *H04L 67/141* (2013.01)

(58) Field of Classification Search
    None
    See application file for complete search history.

(56) References Cited

U.S. PATENT DOCUMENTS

2018/0109493 A1   4/2018   Khan et al.
2021/0377156 A1   12/2021   Michael et al.
2023/0079444 A1*   3/2023   Parla ................... H04L 61/4511
                                 726/11

2023/0138372 A1*   5/2023   Kreger-Stickles .... H04L 63/164
                                 709/220
2023/0179445 A1*   6/2023   Cidon ..................... H04L 43/08
                                 370/254
2024/0314140 A1*   9/2024   Beevor ................. H04L 63/107

FOREIGN PATENT DOCUMENTS

CN        115242546 A     10/2022

OTHER PUBLICATIONS

PCT/US2024/042890, International Search Report and Written Opinion, mailed on Nov. 28, 2024, 12 pages.

* cited by examiner

*Primary Examiner* — Philip J Chea
*Assistant Examiner* — James Ross Hollister
(74) *Attorney, Agent, or Firm* — David H. Judson

(57) ABSTRACT

A service for automatic discovery of locations at which instances of an internal enterprise application are located. The service is configured to facilitate routing of connection requests directed to the internal enterprise application, which is hosted in distinct enterprise locations. The service works in association with a set of connectors that each have an associated Internet Protocol (IP) address (typically of a device to which the connector is coupled) at which it is reachable and through which a connection to an internal enterprise application instance can be proxied. Connections to the internal enterprise application are routable along a network path from a client to a given connector through a set of intermediary nodes. Using information collected from the connectors, the service performs a series of correlations to enable service provider mapping technologies to make both global and local traffic mapping decisions for these internal enterprise resources. In a variant embodiment wherein connectors can access the application across site-to-site connections, the system also leverages connector-to-origin latency data to facilitate a full path mapping solution.

19 Claims, 13 Drawing Sheets

| CONNECTOR | CIDR CONFIGURATION |
|-----------|---------------------|
| CONNECTOR-V | 10.9.0.0/16 |
| CONNECTOR-W | 10.10.0.0/16 |
| CONNECTOR-X | 10.10.0.0/16 |
| CONNECTOR-Y | 10.11.0.0/16 |
| CONNECTOR-Z | 10.12.0.0/16 |

FIG. 6

| CONNECTOR | PUBLIC IP |
|-----------|-----------|
| CONNECTOR-V | 1.1.2.2 |
| CONNECTOR-W | 1.2.3.4 |
| CONNECTOR-X | 1.2.3.4 |
| CONNECTOR-Y | 1.3.4.5 |
| CONNECTOR-Z | 1.4.5.6 |

FIG. 7

| | CONNECTOR | RTT TIME (ms) |
|---|---|---|
| POP-A | CONNECTOR-V | 200 |
| | CONNECTOR-W | 99 |
| | CONNECTOR-X | 99 |
| | CONNECTOR-Y | 25 |
| | CONNECTOR-Z | 110 |
| | | |
| POP-B | CONNECTOR-V | 122 |
| | CONNECTOR-W | 70 |
| | CONNECTOR-X | 70 |
| | CONNECTOR-Y | 72 |
| | CONNECTOR-Z | 101 |
| ○ ○ ○ | ○ ○ ○ | ○ ○ ○ |
| POP | | |

1600

| CONNECTOR | ORIGIN | RTT |
|---|---|---|
| CONNECTOR-1 | ORIGIN-X | 3 |
| CONNECTOR-1 | ORIGIN-Y | 80 |
| CONNECTOR-1 | ORIGIN-Z | 100 |
| CONNECTOR-2 | ORIGIN-X | 81 |
| CONNECTOR-2 | ORIGIN-Y | 2 |
| CONNECTOR-2 | ORIGIN-Z | 70 |
| ○<br>○<br>○ | ○<br>○<br>○ | ○<br>○<br>○ |

1602

| SWITCHING NODE | CONNECTOR | RTT |
|---|---|---|
| SWITCHING-NODE-1 | CONNECTOR-1 | 85 |
| SWITCHING-NODE-1 | CONNECTOR-2 | 50 |
| SWITCHING-NODE-2 | CONNECTOR-1 | 115 |
| SWITCHING-NODE-2 | CONNECTOR-2 | 20 |
| SWITCHING-NODE-3 | CONNECTOR-1 | 50 |
| SWITCHING-NODE-3 | CONNECTOR-2 | 40 |
| SWITCHING-NODE-4 | CONNECTOR-1 | 20 |
| SWITCHING-NODE-4 | CONNECTOR-2 | 110 |
| ○<br>○<br>○ | ○<br>○<br>○ | ○<br>○<br>○ |

1604

| SWITCHING NODE | SWITCHING NODE | RTT |
|---|---|---|
| SWITCHING-NODE-1 | SWITCHING-NODE-2 | 22 |
| SWITCHING-NODE-1 | SWITCHING-NODE-3 | 40 |
| SWITCHING-NODE-1 | SWITCHING-NODE-4 | 60 |
| SWITCHING-NODE-2 | SWITCHING-NODE-3 | 33 |
| SWITCHING-NODE-2 | SWITCHING-NODE-4 | 100 |
| SWITCHING-NODE-3 | SWITCHING-NODE-4 | 22 |
| ○<br>○<br>○ | ○<br>○<br>○ | ○<br>○<br>○ |

FIG. 16

GLOBAL MAPPING TO INTERNAL APPLICATIONS

BACKGROUND

Technical Field

This application relates generally to techniques for managing traffic on a network.

Brief Description of the Related Art

In Zero Trust Network Access (ZTNA) and Software-Defined WAN architectures, it is common to see intermediary nodes along the path between a given source and destination node. For example, a common method to protect the destination node from unwanted inbound connections is to utilize a firewall that blocks inbound traffic to the destination node located inside a private network (such as an enterprise network).

It is known in the art for such a destination node to initiate a connection outbound to the intermediary node on the public Internet, see e.g., U.S. Pat. No. 9,491,145 (Secure Application Delivery System With Dial Out and Associated Method). That connection serves as a tunnel into the private network. When a source node (e.g., an end user client) wants to connect to the destination node, it is directed to connect to the intermediary node. The intermediary node stitches that connection to the previously created outbound connection (the tunnel) from the destination node. The result is to create a facade of an end-to-end connection between the source and destination nodes. The intermediate node can then proxy the traffic between the source and destination. In this way, a remote client can gain access to a private application running on the destination node.

As mobile users and applications that they use are becoming ubiquitous, those applications that once lived in a single data center have begun to evolve. Those same applications can now be hosted by multiple servers for more CPU, more memory, more bandwidth, load-balancing, or even high-availability. The applications can even be hosted in multiple datacenters for redundancy, better geographic distribution, or even for compliance.

The challenge with applications being hosted in a multitude of locations is managing how an end-user locates the right resource and asset he or she is trying to find. To address this problem, typically an Information Technology (IT) administrator stands up these resources, and Internet Protocol (IP) addresses are then assigned to them, either dynamically or statically. An enterprise's Domain Name System (DNS) resolver is then mapped to these IP addresses. The enterprise resolver may be multi-zoned or provide for multi-views. In the case of multi-zoned DNS servers, one DNS server for a top-level domain (e.g., "example, com") typically serves as a parent. The parent server can then specify child servers for delegating subdomain requests (e.g., a request to resolve "subdomain1.example.com"). A DNS view, which is sometimes referred to as split-horizon or split-view DNS, is a configuration that allows responding to the same DNS query differently depending on the source of the query. In multi-views, the DNS server can specify what resolution to serve back based on the source IP address. For example, a multi-view configuration for a domain (e.g., test.example.com) may be configured to respond with a first IP address (e.g., 10.10.1.2) when the request's source is on the 10.10.0.0/16 CIDR (Classless Internet Domain Routing) block, and otherwise with a second (e.g., 96.10.10.20). As an alternative to the above, the IT administrator may configure a load balancer, where all the IP addresses are configured as nodes for a particular application or resource.

The above-described solutions thus rely on manual static configuration to do mapping, and they can be inefficient and time consuming to manage. Further, and in the case of multi-views, the solutions are inefficient when a client travels across geographies, or if some origins do not exist in a given data center. As such, intelligent mapping of a connection through a service provider's overlay network remains a challenge.

BRIEF SUMMARY

In one embodiment, the subject matter herein provides a location service for automatic discovery of locations (typically non-public IP addresses) at which instances of an application, such as an internal enterprise application, are located and executing. The location service is configured to facilitate routing of connection requests directed to the internal enterprise application, which typically is hosted (as a distributed resource) in a set of distinct physical or network locations associated with the enterprise. The location service works in association with a set of connectors (sometimes referred to as "agents"), wherein typically there are one or more connectors in each distinct enterprise location. Given that the enterprise network needs to be secure, typically the connectors are firewalled from the publicly-routable Internet but each is associated with a device (e.g., a NAT, firewall or other similar system fronting the connector) that has a public Internet Protocol (IP) address through which a connection to an internal enterprise application instance can be proxied. The connector itself is hidden from the public Internet and only accessible when it initiates active connections outbound (typically through the device to which it is coupled).

Connections to the internal enterprise application are proxyable along a network path from a client (typically mobile, or otherwise external to the enterprise network itself) to a given one of the connectors through a set of intermediary nodes. Typically, the intermediary nodes and the location service are associated with a service provider (e.g., a Content Delivery Network (CDN)), which provides the location service to facilitate the routing by providing information to the intermediary nodes from which service provider mapping decisions are then made. Using the information collected from the connectors, the location service performs a series of correlations (viz., finding matching connections and their corresponding public IP addresses) to enable the service provider mapping technologies to make both global and local traffic mapping decisions for these internal enterprise resources.

To this end, and for each given connector, a set of data is discoverable. The set of data comprises a public IP address of a device associated with the connector (as noted above, typically the public IP address that the connector gets NATed to when making outside connections), the IP addresses reachable within the location from the connector, and a latency associated with a path between each of one or more intermediary nodes and the connector. The service provider operates an overlay network having a set of intermediary nodes, such as a first intermediary node, and a second intermediary node, with the first intermediary node being closest to a requesting client. In operation, the location service receives a first query from the first intermediary node, the first query having been generated at the first intermediary node in response to receipt (at the first intermediary node) from the requesting client of a connection request (to what the client thinks is the application). That original connection request would have been directed to a DNS resolver associated with the enterprise and been used to connect the client to the first intermediary node.

In response to the first query (that includes the hostname the client is attempting to contact), the location service provides the first intermediary node given information, e.g., a first list of connectors that, based on the set of data discovered, can reach the target, together with the public IP addresses associated with the connectors identified on the first list of connectors. The given information may also include a latency associated with the path between each of the one or more intermediary nodes and the connector. The given information is discovered by the location service. After providing the given information, the location service then receives a second query, this time from the second intermediary node. The second query is generated at the second intermediary node in response to receipt at the second intermediary node of the connection request, which has been forwarded from the first intermediary node. This connection request forwarding (relaying) continues across the overlay network intermediary nodes until the connection request reaches a best-connected connector in a data center hosting the internal enterprise application instance(s). The best-connected connector then selects an IP address from the IP addresses within the location and establishes a connection to the internal enterprise application, thereby completing an end-to-end connection between the client and the internal enterprise application.

The above solution provides a mechanism that enables global mapping on a hop-by-hop basis to route clients to a closest connector. As a variant embodiment, there may be scenarios where data centers that host connectors are themselves interconnected (e.g., by Multi-Protocol Label Switching (MPLS)). In this scenario, the solution described above may end up routing the client to the connector closest to the client, even though the connector itself may still be far away from an origin. As an extension of the above-described system, the technique of this disclosure provides for global mapping when implemented in association with such interconnected data center sites. The approach extends the mapping to also account for connector-to-origin latency.

The foregoing has outlined some of the more pertinent features of the subject matter. These features should be construed to be merely illustrative. Many other beneficial results can be attained by applying the disclosed subject matter in a different manner or by modifying the subject matter as will be described.

BRIEF DESCRIPTION OF THE DRAWINGS

For a more complete understanding of the subject matter and the advantages thereof, reference is now made to the following descriptions taken in conjunction with the accompanying drawings, in which:

FIG. 6 depicts a Connector/CIDR Configuration data table developed for the enterprise configuration shown in FIG. 5;

FIG. 7 depicts a Connector/Public IP Address table for the enterprise depicted in FIG. 5;

FIG. 16 depicts a Connector-to-Origin Latency data table that is utilized in the variant embodiment to influence routing decisions with respect to connectors that are hosted in data centers that are interconnected with one another.

DETAILED DESCRIPTION

Figure 1:
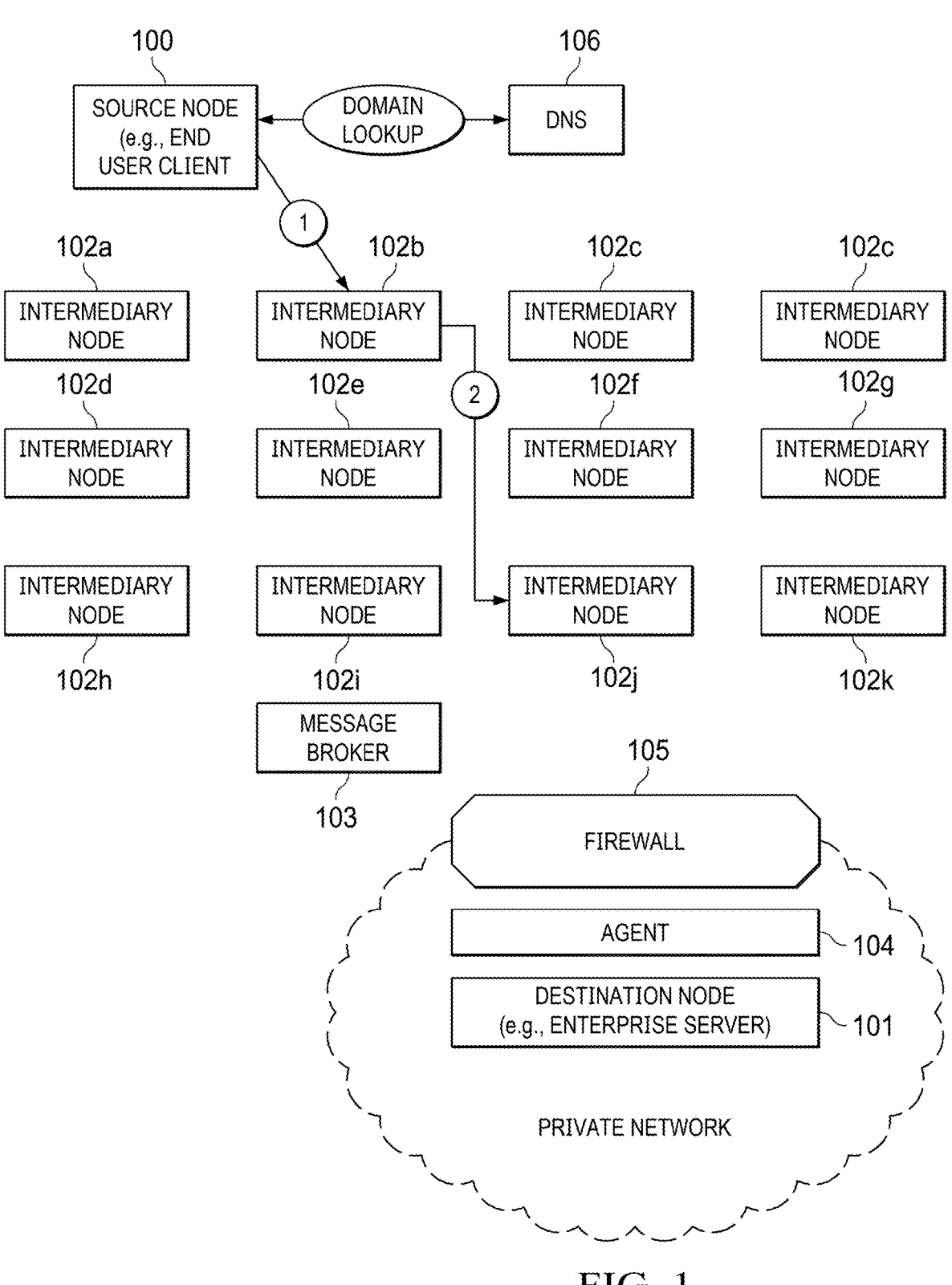
FIG. 1 is a block diagram illustrating an overlay network.

As noted above, this disclosure describes a location service for automatic discovery of locations at which instances of an application, e.g., an internal enterprise application, are located. In general, the location service is configured to facilitate routing of connection requests directed to the internal enterprise application, which typically is hosted in distinct enterprise locations that together comprise an enterprise network. As will be described, the location service works in association with a set of connectors (or "agents"). A connector has an associated public Internet Protocol (IP) address at which it is reachable and through which a connection to an internal enterprise application instance can be proxied. As noted above, however, the connector itself does not have a public IP address and thus is not reachable from a client outside of the firewall. The public IP address associated with a connector typically is the IP address of a NAT device, and that address can change at any moment. The connector associated with that public IP address is hidden from the public Internet and only accessible when it initiates active connections outbound (usually through a device such as a NAT, a firewall or other similar system fronting the connector). Connections to the internal enterprise application are proxied or tunneled along a network path from a requesting client to a given connector through a set of intermediary nodes. Typically, the intermediary nodes are associated with an overlay network, such as a Content Delivery Network (CDN). A service provider operates the overlay network, and the overlay network comprises various systems and services (e.g., edge servers, mapping technologies, and the like) that are well-known. A commercial CDN of this type is operated by Akamai Technologies, Inc, of Cambridge, Massachusetts. As will be described below, and using information collected from the connectors, the service performs a series of correlations (viz., finding matching connectors and their corresponding associated public IP addresses) to enable service provider mapping technologies to make both global and local traffic mapping decisions for these internal enterprise resources.

In a typical overlay network, the service provider deploys, provisions and operates servers as a shared infrastructure. The service provider manages the overlay network, providing a variety of infrastructure as a service (IaaS) and software as a service (SaaS). Such services can include accelerating, securing, or otherwise enhancing remote client access to private network applications and servers. Typically, the service provider operates a DNS-based mapping system to direct clients to selected intermediary nodes, and to route traffic in and amongst the intermediary nodes to the destination. As will be described, the techniques herein leverage existing routing systems—which assume that intermediary nodes are able to establish forward bound connections to the destination (e.g., via BGP, OSPF, or other application layer protocols)—to work in an environment where a destination is actually not yet reachable on a forward-bound connection.

FIG. 1 illustrates an example of an overlay network formed by a set of intermediary nodes 102a-k (generally "102"), which should be understood to be deployed in various locations around the Internet. (Note that in some cases, the intermediary nodes 102 may be referred to as bridging nodes or switching nodes, with no material difference in meaning as relates to the subject matter hereof.)

Each intermediary node 102 may be implemented, for example, as a proxy server process executing on suitable hardware and located in a datacenter with network links to one or more network service providers. As mentioned, intermediary nodes 102 can be deployed by a service provider to provide a secure application access service for source nodes 100 (e.g., an end user client) to connect to a destination node 101 (e.g., an enterprise server) that is located in a private network (e.g., the enterprise's network). A typical example of a private network is a corporate network separated from the overlay network and indeed the public Internet by a security boundary such as a NAT and/or firewall 105, as illustrated.

Also shown in FIG. 1 is a request routing component, in this example a DNS system 106, which operates to direct given source nodes 100 to a selected intermediary node 102. The selection of intermediary nodes 102 is determined, typically, based on the relative load, health, and performance of the various intermediate nodes, and is well known in the art. Intermediary nodes 102 that are closer (in latency, or network distance, terms) to the source node 100 usually provide a better quality of service than those farther away. This information is used by the DNS 106 to return the IP address of a selected intermediary node 102, that is, in response to a domain lookup initiated by or on behalf of the source node 100. Again, such request routing technologies are well known in the art, and more details can be found for example in U.S. Pat. No. 6,108,703.

Finally, FIG. 1 shows a message broker 103, and an agent 104. The message broker can be realized, e.g., as a publication/subscriber service such as MQTT or Apache Kafka. As such, in this example embodiment broker 103 represents a set of one or more interconnected servers providing the message broker service. The agent 104 can be an appliance or piece of software in the private network which helps facilitate on-demand connections out to the overlay network and bridge connections to the destination node. The agent 104 is also referred to herein as a "connector" application.

The connector agent 104 may be combined or otherwise communicatively coupled to one or more destination nodes.

The following describes a representative operation of the above-described system. Initially, the source node 100 sends (or a recursive DNS resolver sends on its behalf) a DNS request to resolve a domain name associated with the desired service ("domain lookup"). That domain name is CNAMEd (CNAME being a DNS "Canonical Name") to another name for which the DNS 106 is authoritative (or the DNS 106 is made authoritative for the original hostname). Either way, the result of the domain lookup process is an IP address that points to a selected intermediary node, in this example 102b.

Figure 2:
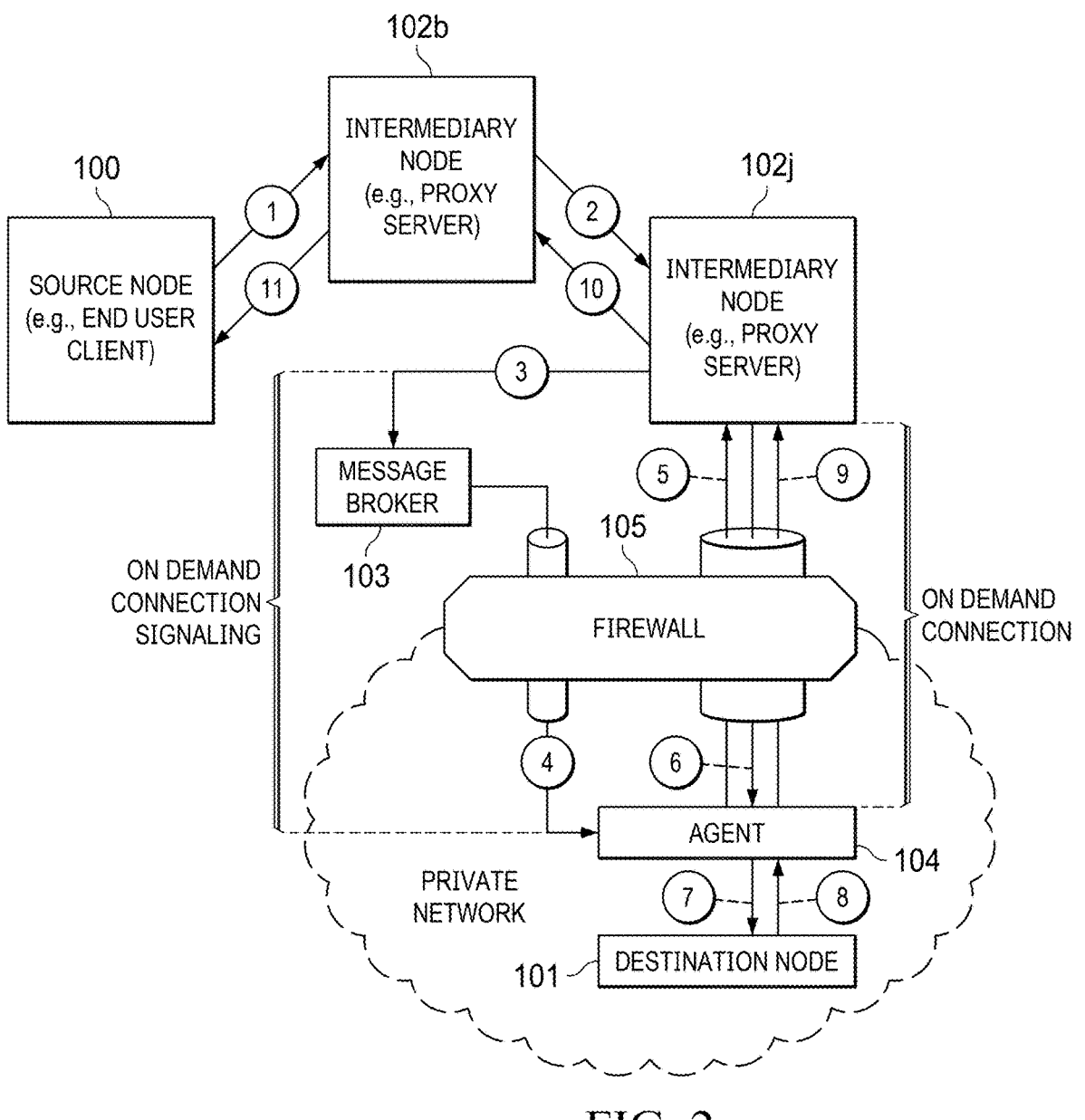
FIG. 2 is a diagram focusing on certain aspects of the system shown in FIG. 1.

The source node 100 sends a message(s) to intermediary node 102b over the Internet seeking a service from the destination node 101 (arrow 1). The job of the intermediary node 102b (and the system in general) is to tunnel the traffic from source node 100 to destination node 101. The term "tunnel" in this context is used to refer to encapsulation of data sent from the source node 100 to the destination node 101, and vice versa. It is not limited to any particular protocol. Example protocols for TCP/IP packets, or IP packets that are TCP terminated at the overlay or a connector, or for HTTP messages or message bodies include, without limitation, TCP/TLS, GRE, IPSec, HTTP2, and QUIC. As shown by arrow 2, intermediary node 102b determines to tunnel the source node's traffic to node 102j, which is another node in the overlay network. Nodes 102b and 102j may have a previously established pool of connections between them which can be reused for this purpose. (Such inter-node connections may employ enhanced communication protocols between them, e.g., as described in U.S. Pat. No. 6,820,133). The source node's traffic may be tunneled across the overlay via any one or more intermediary nodes; the example of two nodes shown in FIG. 1 is not limiting. When node 102b reaches out to 102j, node 102j is not connected to agent 104 and/or the destination node 101. To make such a connection, an on-demand connection outbound from agent 104 is initiated. FIG. 2 illustrates that process. FIG. 2 references the same system shown in FIG. 1, and arrows 1 and 2 represent the same operations already described for FIG. 1). FIG. 2, however, focuses on certain components in detail to show the process for the on-demand connection.

Starting at arrow 3 of FIG. 2, node 102j signals message broker 103 to notify agent 104 that node 102j needs an on-demand connection outbound from the agent 104/destination node 101. The message broker 103 operates a message delivery service in the manner of, e.g., a pub-sub mechanism in which agent 104 (and other agents like it deployed in other private networks) are subscribed to topics advertised by the message broker 103. An appropriate topic might be related to the private network owner or the destination node 101. Arrow 4 of FIG. 2 shows the message broker delivering the signal from the intermediary node 102j to agent 104. The signal can be delivered through a long-lived communication channel (e.g., a persistent connection) that is previously established through the firewall 105. For example, upon initialization the agent 104 may reach out to the overlay network to register and be instructed to dial out to a given IP address of the message broker 103. Preferably, the signal is a message that contains information identifying the intermediary node 102j, e.g., by IP address, and it may contain other information necessary or helpful to set up the outbound connection to the intermediary node 102j. In response to receiving the signal at arrow 4, agent 104 initiates an on-demand connection through the firewall and out to intermediary node 102j (arrow 5). At this point, node 102*j* can associate the tunnel from intermediary node 102*b* with the tunnel into private network to agent 104. Using this tunnel, intermediary nodes 102*b* and 102*j* can proxy data from the source node 100 to the agent 104 (arrows 1, 2, 6), which in turn can proxy the data to destination node 101 (arrow 7). Likewise, data from the destination node 101 can be proxied back to the source node 100 (arrows 8, 9, 10, 11). Source and destination thus can have connectivity. Broadly speaking, any data (e.g., requests and responses) sent from source node 100 to destination node 101 can be tunneled via nodes 102*b*, 102*j*, and agent 103 to the destination node, and responses from destination node 101 can likewise be tunneled back to the source node 100 so as to provide the requested private service.

With the above as background, the techniques of this disclosure are now described.

Figure 3:
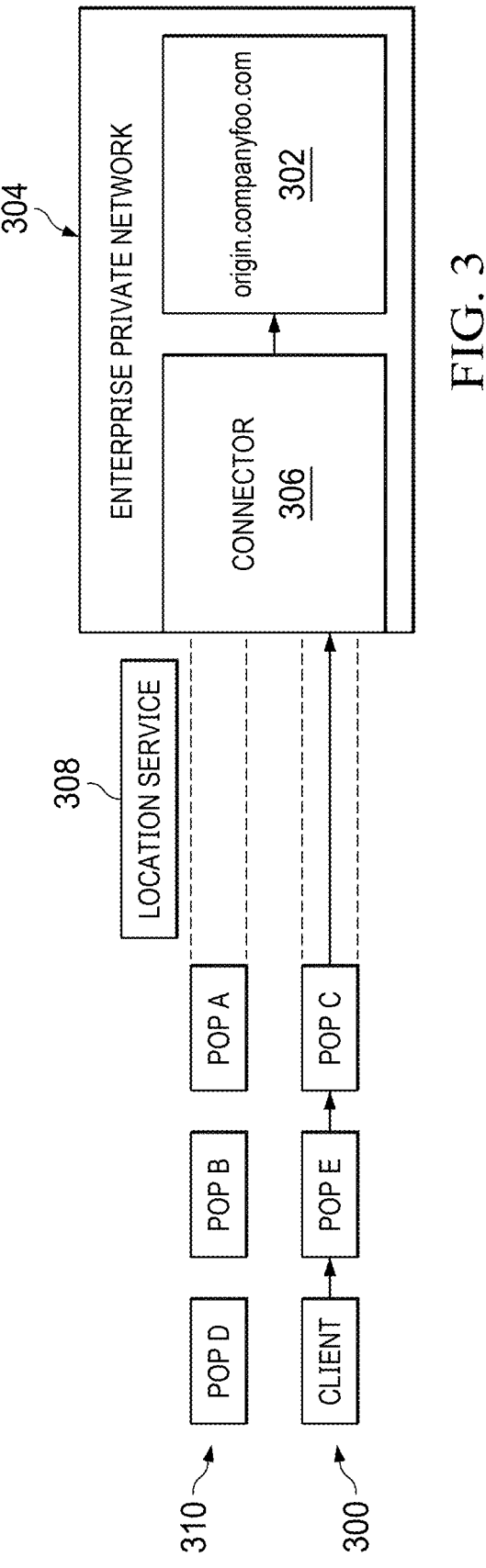
FIG. 3 depicts a Zero Trust Network Access (ZTNA) service provided to a set of tenants (enterprises) by an overlay network, wherein a tenant has an associated enterprise application that resides in multiple private geo-locations.

FIG. 3 depicts a representative use case wherein a client 300 seeks to obtain a service from a resource associated with the origin.companyfoo.com domain 302. Typically, the resource is an internal enterprise application executing within an enterprise private network 304. The location depicted supports a connector 306, as previously described. There may be multiple connectors running in the enterprise private network, which is typically operated in a distributed manner. Generalizing, the use case is where there are multiple origin servers supporting the enterprise application residing in multiple geo-locations. In a typical operating scenario, an overlay network service provider operates location service 308, together with intermediary nodes (identified as POP A through POP E) 310. Intermediary nodes may be operated or associated with one or more third parties. As will be seen, the location service 308 facilitates the routing of a connection request from the client 300 and that is directed to domain 302 (and, in this example, for the purpose of locating, accessing and using the internal enterprise application). To this end, and as will be described, the solution herein facilitates such routing by considering all origin servers hosting the application, as well as all service provider intermediary nodes for intermediary paths that are useful to route the connection request to an instance of the application. Further, the approach herein provides for a highly-automated solution that requires little static configuration on a per application or per class of client basis.

Figure 4:
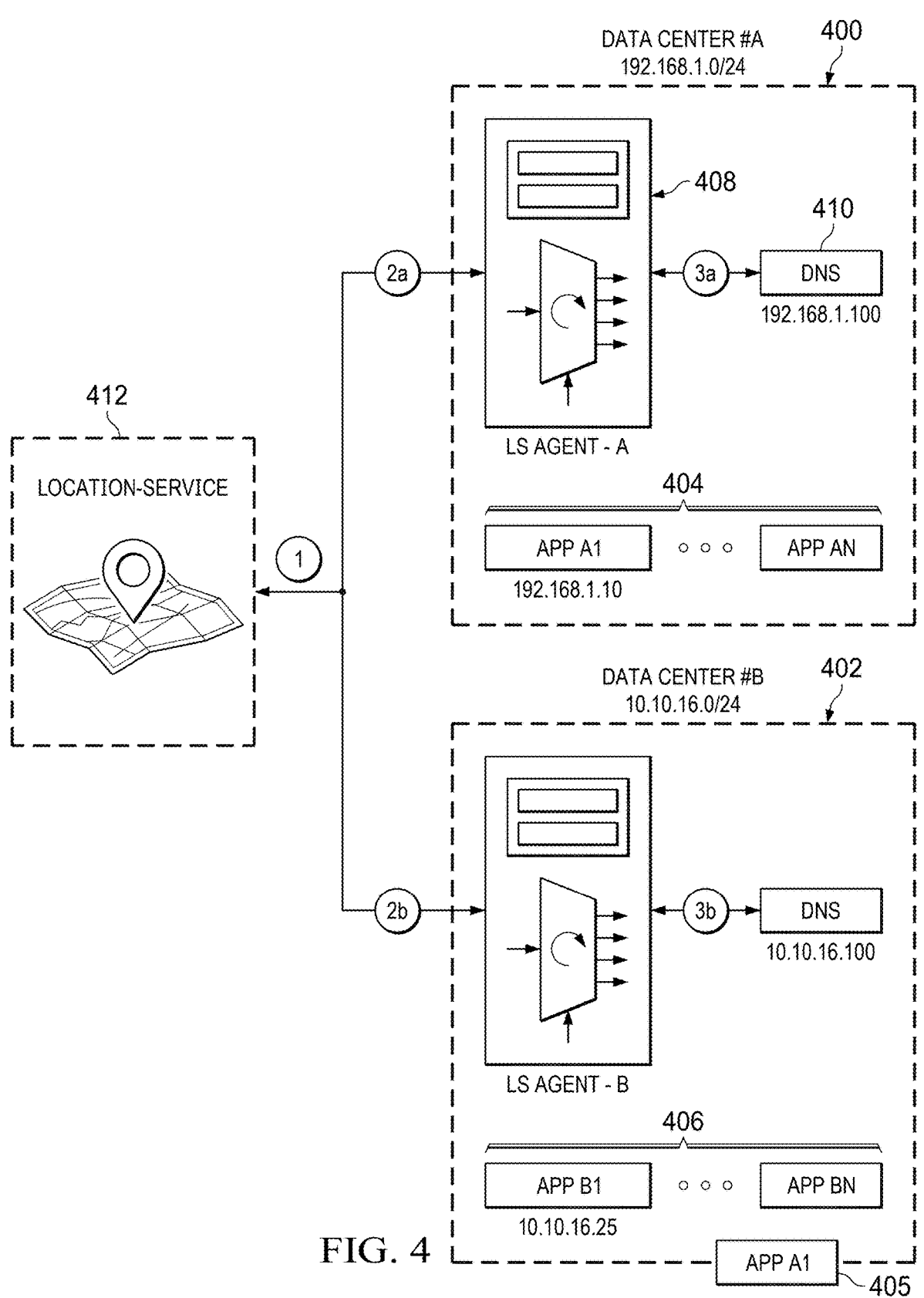
FIG. 4 depicts a high-level overview of a location service of this disclosure.

FIG. 4 depicts the high-level operation of the service. In this simplified representation, which is not intended to be limiting, there are two data centers 400 and 402 at which a set enterprise application(s) are available. Thus, data center 400 supports a first set of applications (App A1 . . . . AN) 404, and data center 402 supports an instance of App A1 405, together with a second set of applications (App B1 . . . . App BN) 406. The applications in the first and second sets thus may overlap, or they may be different. Each data center runs a connector 408, and a DNS resolver 410. The connectors and DNS resolvers typically are implemented in software. The DNS resolvers typically run on behalf of the enterprise network as a whole. The connectors 408 run as agents of a location service 412, which typically runs in a cloud-based infrastructure. The connector 408 operating within the data center (and triggered by the location service) is responsible for performing DNS requests to the associated DNS resolver 410 inside that location, and for sharing the DNS response back to the location service 412. The location service also contains a configuration for what DNS resolvers exist within the enterprise network, along with what connector(s) can service what CIDR blocks of that network. Assume now that the location service 412 is queried for the IP address of App A1. In response, the location service 412 first determines the configured DNS resolvers, in this example, the resolvers located at 192.168.1.100 and 10.10.16.100. Once the resolvers are determined, the location service 412 determine what connectors can service those DNS resolvers, here LS Agent-A, and LS Agent-B. Using an authenticated channel with those agents, the location service requests App A1's IP address. The agents perform DNS A and AAAA requests for App A1's IP address and, in this example, both connectors respond since the application is running there. Thus, for example, resolver 192.168.1.100 responds with 192.168.1.10, and resolver 10.10.16.100 responds with 10.10.16. 24. The agents each share the respective information back to the location service 412, which puts the information together to discover that App A1 is available at each location.

Figure 5:
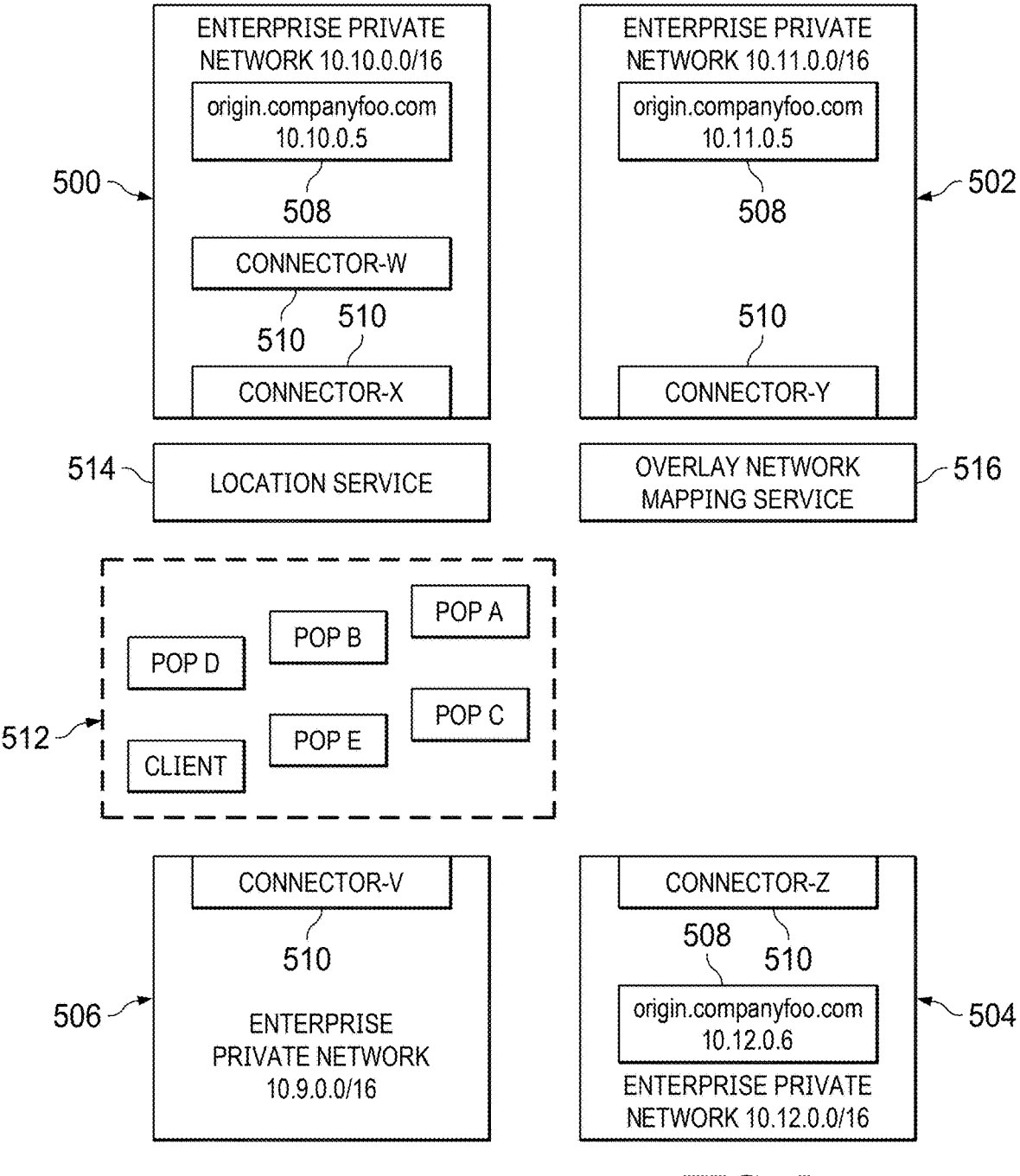
FIG. 5 depicts a representative example use case wherein a given enterprise hosts an internal enterprise application at a set of private geo-locations.

With the above as general background, the following provides a detailed description of the internal application location service of this disclosure. In a typical operation, a connection for an internal application is received at a service provider node on the Internet. The following method to retrieve the internal IP addresses of the internal application is then carried out. Ideally, all candidate internal IP addresses should be returned so that the overlay network mapping system can pick the best one. FIG. 5 depicts the use case. Here, and for purposes of illustration only, enterprise private network operates at four (4) locations 500, 502, 504 and 506, as depicted. The internal application is reachable at origin.companyfoo.com 508, at the identified IP addresses, at three (3) of the locations. Each location operates one or more connectors 510, also as depicted. As was depicted in FIG. 1, a set of intermediary nodes are available in an overlay network being managed by the service provider. As depicted, these intermediary nodes are service provider Points of Presence (POP) 512, such as POP A through POP E. FIG. 5 also depicts the location service 514 of this disclosure, and the overlay network mapping service 516 that is leveraged by the location service, as will be described below.

In this example, it is assumed that administrators have configured all CIDRs reachable to a connector or otherwise based on a desired (typically, East-West) network segmentation. Using addressing identified in FIG. 5, for example, a Connector/CIDR Configuration table is then as shown in FIG. 6.

Figures 8, 9:
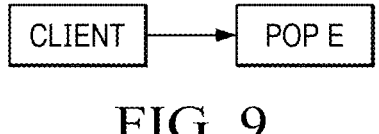
FIG. 8 depicts POP and Connector/RTT Time data table for the enterprise.
FIG. 9 depicts step (1) of a connection request forwarding method of this disclosure with respect to the example use case shown in FIG. 5.

Preferably, each connector 510 has a local job running that periodically connects out to some or all service provider Points of Presence (POP) 512. This enables the system to provide connector public IP address discovery. In particular, using this local job (e.g., a ping), the location service (the service provider) reads the source IP address of the connection and learns the public facing Network Address Translation (NAT) IP address that the connection is behind, and this public IP address is then recorded in a location service database. This discovered public NAT IP address is later used in geo-location lookups, CIDR collapsing, for latency calculations, and so forth, as will be seen. Each connector runs the local job and gathers the data about the public-facing IP address. The location service collects the data and stores the information, e.g., as a Connector/Public IP Address table as depicted in FIG. 7. In addition, and once again using the local job initiated from the connector, the roundtrip time (RTT) between the connector and each POP (intermediary node) 512 is also measured and stored in another database table. This table depicts the relevant RTT measurements (more generally, latency) and, in this example embodiment, each POP has an associated Connector/RTT Time sub-table as depicted in FIG. 8. The structure and format of the above-described data tables may vary.

With the above discovery pre-requisites in place, and continuing with the above use case (for example purposes only), the following describes how the location service then maps client connections to a best origin that hosts the desired enterprise resource. The notion of "best" here may be a relative term. As noted, and based on the above-described provisioning and discovery, upon receiving a client connection the mapping system knows the following information: (i) candidate_origin_ips: all internal IP addresses for the application; (ii) candidate_connectors: the set of connectors that can reach at least one of the internal origin IP addresses; (iii) candidate_public_ips: for each candidate connector, what are the unique IP addresses within the set of candidate connectors; and (iv) last_mile_ping_scores: from each service provider POP, what is the RTT to each candidate connector? With this set of information, the mapping system can route any client connection to the "best" candidate_connector; where "best" can be defined as lowest RTT or some other defined metric, such as cheapest compute cost, enforcement of a geo-location rule (e.g., German clients should only get routed to EU based origins), and the like. A preferred mapping operation then works as follows.

Figure 10:
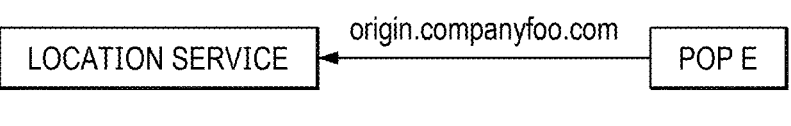
FIG. 10 depicts step (2) of the connection request forwarding method of this disclosure in the example use case.

As step (1), and with reference to FIG. 9, a client 900 attempting to reach origin.companyfoo.com makes a connection request that arrives at the intermediary node 902 (POP E here). At step (2), and with reference to FIG. 10, the service provider intermediary (POP E) queries the location service 1000 to get location details about origin.company-foo.com. At step (3), the location Service queries the enterprise DNS resolver(s) and learns that there are three (3) origin IP addresses (locations 500, 502 and 504 in FIG. 5) that can service this application. Given the example scenario, these addresses are: candidate_origin_ips: = {10.10.0.5, 10.11.0.5, 10.12.0.6}. At step (4), the location service then produces a candidate_connectors list, e.g., using the following logic:

```
for each o := candidate_origin_ips:
    matching_connectors := find_matching_connectors(o)
    for each c: = matching_connectors:
        if c NOT in candidate_connectors:
            candidate_connectors += c
``` candidate connectors: ={connector-w, connector-x, connector-y, connector-z} At step (5), the location service then finds all unique public IP addresses for the set of candidate_connectors, e.g., using the following logic:

```
for each c := candidate_connectors:
    p := get_public_ip_address(c)
    if p NOT in candidate_public_ips
        candidate_public_ips += p
candidate_public_ips: = {1.2.3.4, 1.3.4.5, 1.4.5.6}
```

Figure 11:
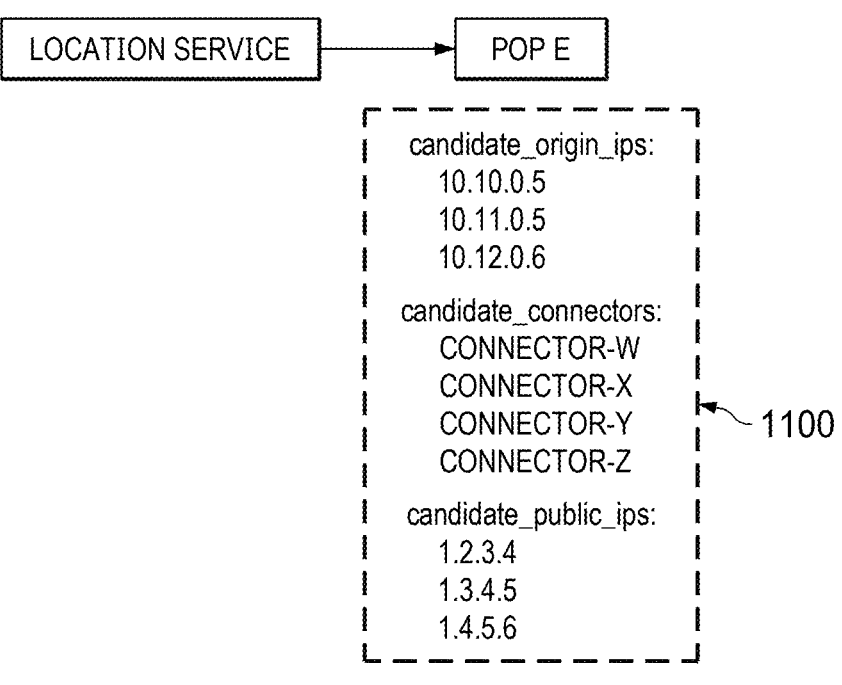
FIG. 11 depicts step (6) of the connection request forwarding method.

At step (6), and as depicted in FIG. 11, the location service returns the information back to the POP that issued the query (here POP_E). In particular, the information comprises a data set 1100 comprising the candidate_origin_ips, the candidate_connectors, and the candidate_public_ips. In a use case where there are expected to be multiple iterations of the above-described process (in order to move the connection request toward a best connector using the intermediaries as relays), and continuing with step (7), the POP can ignore the first two fields and strictly focus on candidate_public_ips. In particular, the intermediary node (POP E) here knows that it just needs to route to a parent intermediary node with the best connectivity to one of the public IP addresses. This is akin to a CDN routing to a parent POP with the best connectivity to a public-facing origin, and existing CDN-style mapping technologies can be used for the candidate_public_ips selection here. The mapping system may consume the connector last_mile_ping_scores to be able to score the full path while making this parent POP selection.

Figure 12:
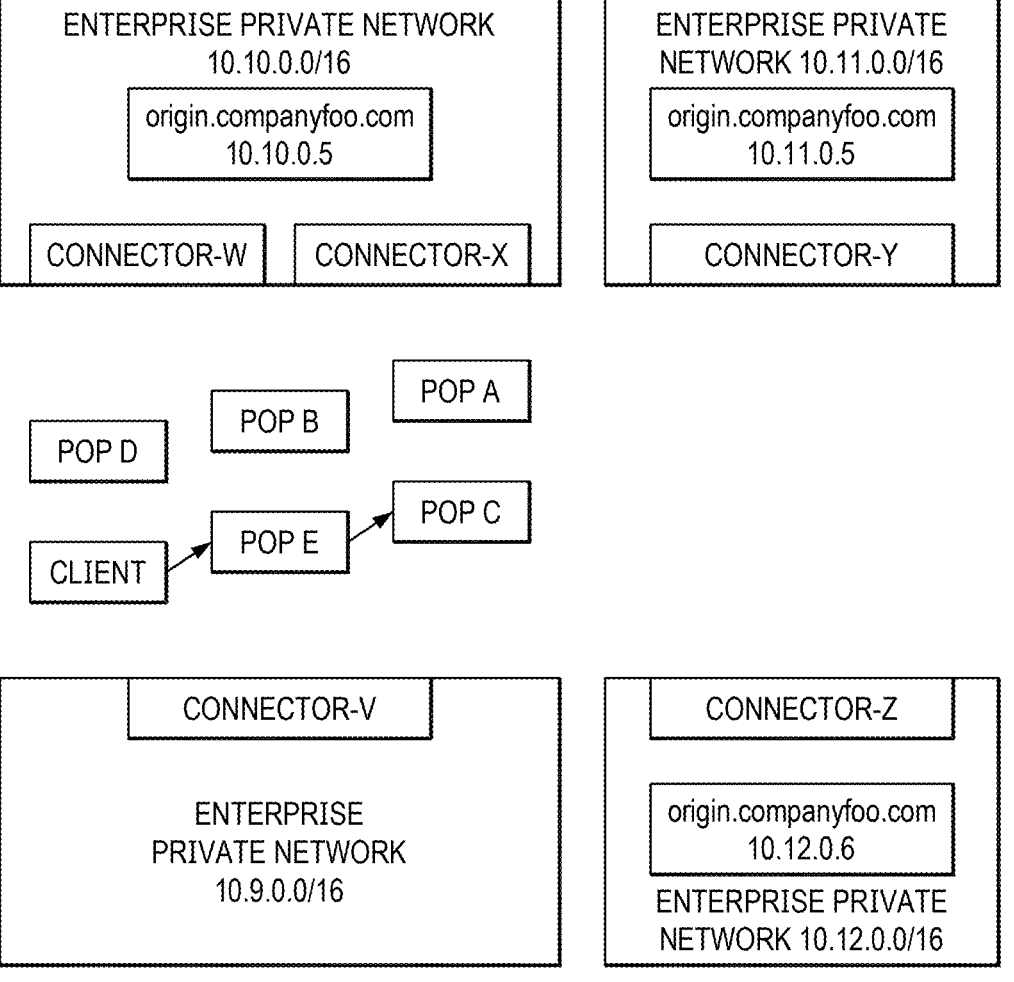
FIG. 12 depicts step (8) of the connection request forwarding method.
Figure 13:
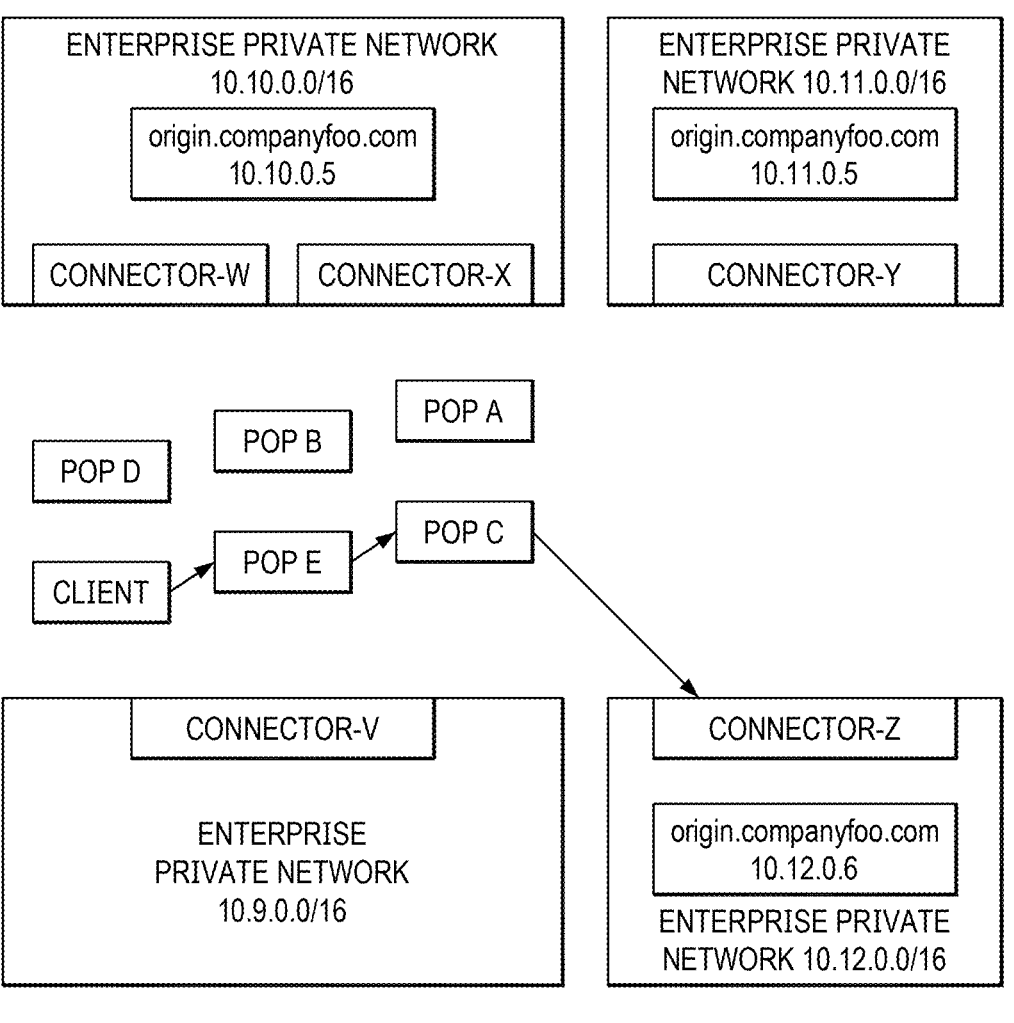
FIG. 13 depicts step (10) of the connection request forwarding method.

At step (8), and as depicted in FIG. 12, the POP forwards the connection to the selected parent POP (in this example POP C), preferably together with the candidate_origin_ips and candidate_connectors information. The connection request forwarding operation then continues. In particular, and at step (9), upon receiving the forwarded client connection, the parent POP re-performs a smaller scoped mapping decision. To this end, and in this example the parent intermediary node simply needs to choose the best-connected connector from the candidate_connectors list, and then route the connection to that connector. The reason that the parent POP (POP C) re-performs the connector selection (instead of basing it off the corresponding candidate connector of the chosen public_ip from the initial POP) is to correct for mis-mappings at the global scope in the event that the earlier mapping decision was based on stale data. In other words, the connection has already been forwarded to the parent POP, so the system might as well choose the best next hop regardless of how the connection arrived at the parent POP. At step (10), and as depicted in FIG. 13, the parent POP forwards the connection to the selected connector, together with the list of candidate_origin_ips.

Figure 14:
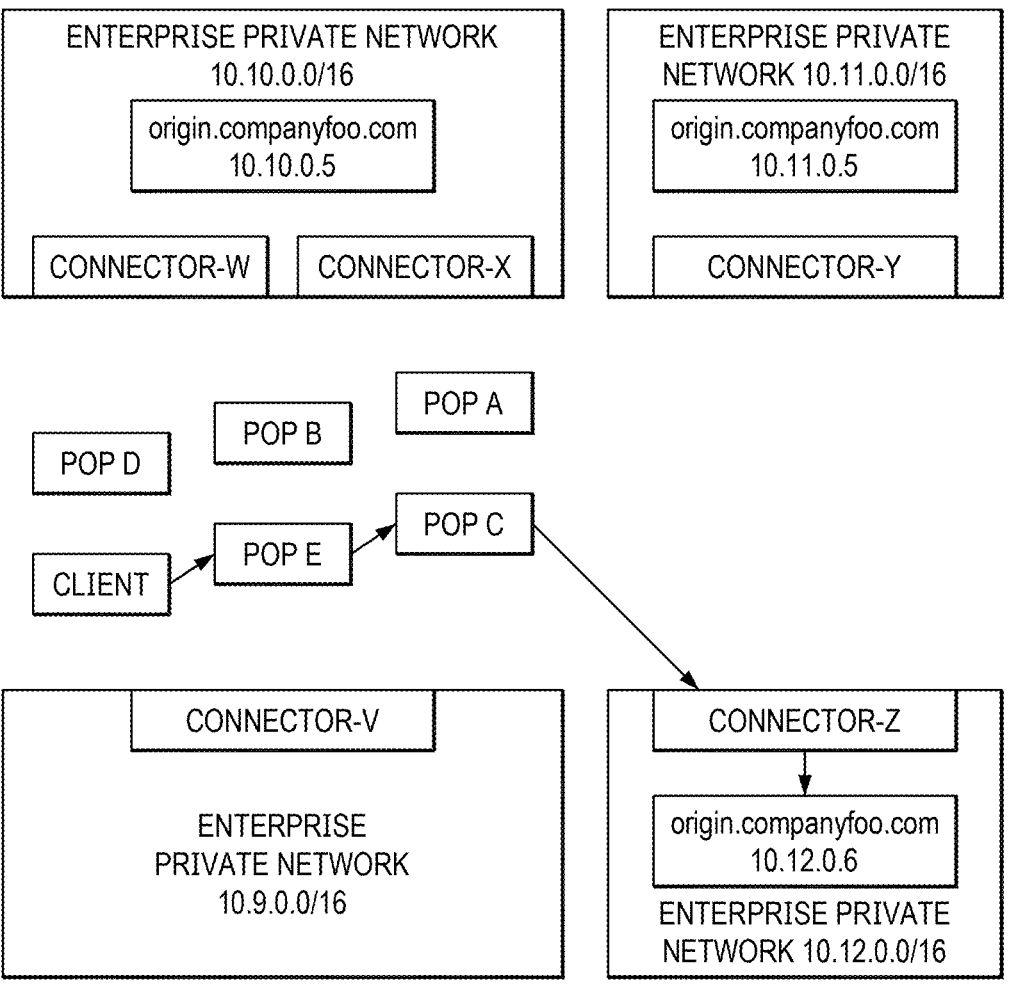
FIG. 14 depicts step (12) of the connection request forwarding method.

At step (11), the connector can simply choose any origin IP address that is reachable from the list of candidate_origin_ips. Although not depicted, the case where some far away networks are reachable by the connector resulting in multiple origins being reachable but with varying connectivity metrics, a separate connector to origin ip/network pinging service can be employed to allow the connector to make a better origin ip selection at this step. At step (12), and as depicted in FIG. 14, the connector makes the connection to the origin to complete the end to end client: origin connection. This completes the processing in this example scenario.

The end result is that through simply publishing all candidate origins to the service provider, the mapping system is able to perform a series of correlations (find matching connectors, find corresponding public IP addresses, etc.) and transform the data set into a resource (public IP addresses) that can leverage pre-existing mapping technologies to make both global and local traffic mapping decisions for internal origins. Compared to VPN, SDWAN, or ZTNA solutions that exist, the disclosed technique requires less configuration at-scale and produces better mapping decisions. Further, and to enable high availability, the location service simply needs to remove a faulty origin from the candidate_origin_ips list. The candidate_connectors and candidate_public_ips are built accordingly and the mapping system routes to the next closest data center to an active origin.

The solution herein provides significant advantages. In particular, and for enterprises using a VPN or ZTNA solution, and as previously noted, challenges to intelligently map clients to origin servers or applications arise, specifically because the origin servers are referenced by an internal IP address that is Request For Comment (RFC) 1918 compliant. In a typical service provider implementation, e.g., where an overlay network provider facilitates the VPN or ZTNA solution, these addresses overlap across tenants, bucketing by CIDR block is difficult or not possible, geo-location is not possible, and measuring RTT from service provider nodes is not possible because the origin servers are located behind firewalls. The location service/connector-based solution described herein removes the restrictions when mapping to RFC 1918 addresses and, in particular, by performing correlation of the RFC 1918 address to reachable connectors, and then using the discovered public-facing NAT (Network Address Translation) IP addresses of the connectors to perform global mapping decisions, e.g., using existing mapping technologies available in the overlay network itself. As noted, the approach herein allows the system to consider all origin servers hosting an application, and to consider all service provider nodes for the intermediary paths, and without resort to static configurations on a per application or per class of client basis.

Variant

Figure 15:
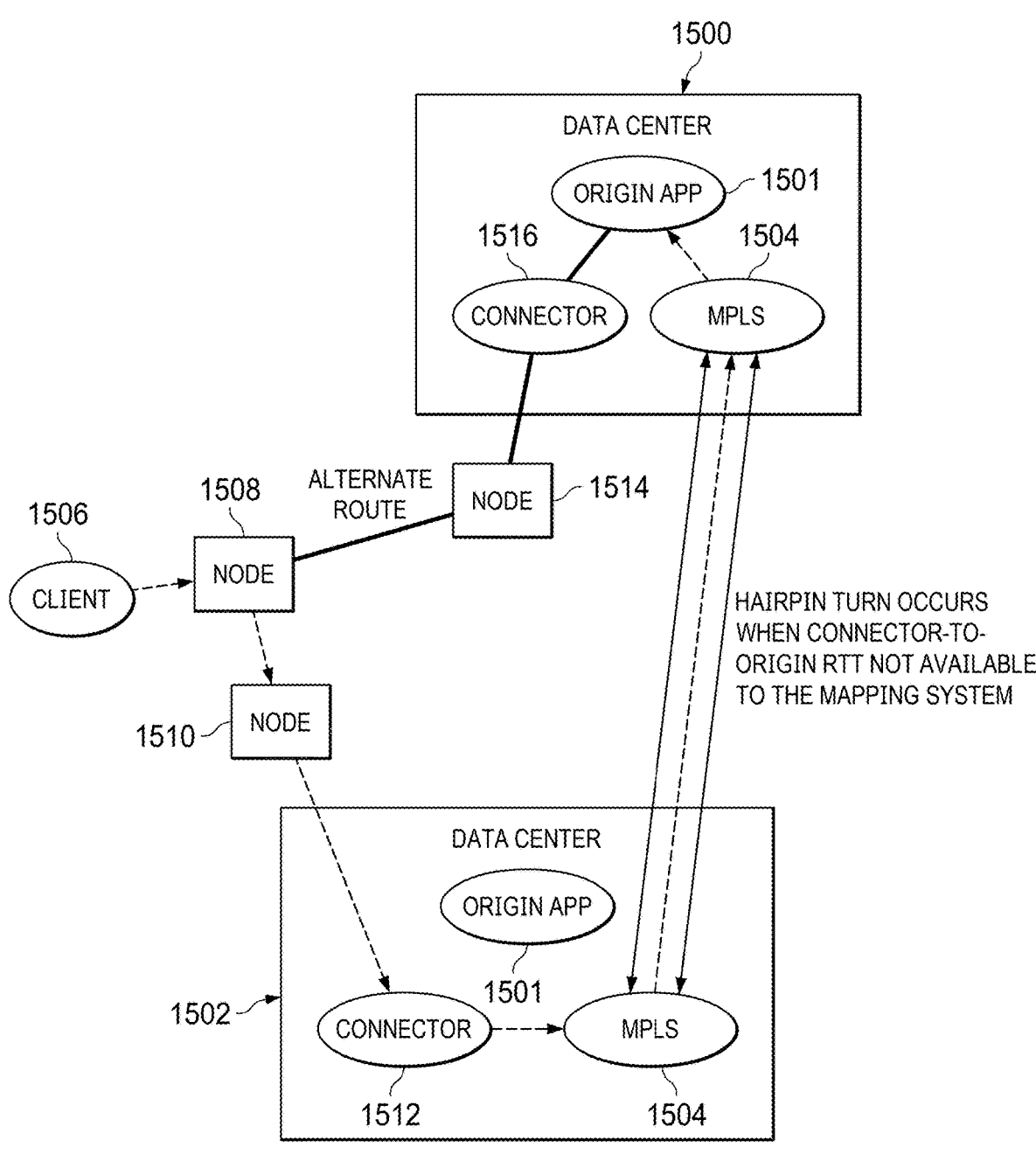
FIG. 15 depicts a variant embodiment wherein connectors are hosted in data centers that are interconnected with one another.

FIG. 15 depicts a variant embodiment wherein the enterprise origin 1501 is available from multiple data centers that are themselves interconnected with one another. Thus, in FIG. 15, data center 1500 is depicted as interconnected to data center 1502 via a Multi-Protocol Label Service (MPLS) 1504. MPLS is a routing technique in telecommunications networks that directs data from one node to the next based on labels rather than network addresses. MPLS can encapsulated packets of various network protocols, and it supports a wide range of access technologies including, without limitation, ATM, frame relay, and T1/E1. In this scenario, the above-described routing (e.g., from client 1506) may cause the connection request to pass through intermediary node 1508, then intermediary node 1510, and then to closest connector 1512 in data center 1502, only to be then hairpinned (through the MPLS connection) to the origin 1501 located in data center 1500. The reason for this hairpin is because the above-described mapping solution does not account for connector-to-origin latency. A system that maps a client to the closest connector when accessing a particular origin may result in large hairpins when not accounting for the full path latency from client-to-origin.

To address this use case, and in addition to measuring latency between enterprise connectors (behind the first appliances that bridge connectivity from outside the firewall to internal applications inside the firewall) and a ZTNA or SDWAN overlay network, the connectors also measure latency to origin(s) (including those located in interconnected data centers), and the connector-to-origin latency data is fed back to the overlay network mapping system to faciliate full path routing when routing to origins behind a firewall.

Thus, and according to this variant embodiment, when enterprise origin(s) are located across interconnected data centers, each connector is further configured to ping all known origins and record a ping score between itself and that origin. Thus, and in the context of FIG. 15, connector 1512 performs a ping (or other network traffic test from which latency data may be obtained or extracted) to each origin 1501 instance, including the instance located in the MPLS-coupled data center 1500. The connectors then publish this latency data (typically round-trip times (RTTs)) to the mapping system. More formally:

```
for each connector:
    for each origin:
        rtt := ping(connector, origin)
```

-continued

```
        save(connector, origin, rtt)
    publish( )
```

At the mapping system, a data table 1600 such as depicted in FIG. 16, is then created and saved for the connector-to-origin scores. As depicted, e.g. Connector-1 (e.g., in data center 1502) has a very small round-trip time (RTT) to the origin instance (Origin-X) that is in the same location, but a larger RTT with respect to the origin instance (e.g., Origin-Y) that is in a connected data center (e.g., in data center 1500). Another origin instance (Origin-Z) is located in still another MPLS-connected data center (not shown), and Connector-1 is even further away from this instance (from an RTT-perspective).

Data table 1600 in FIG. 16 is then one of several data tables stored in the mapping system. As also depicted in this example scenario, data table 1602 is also stored, as is data table 1604. Data table 1602 corresponds to the table described above with respect to FIG. 8, wherein the relevant RTT measurements (more generally, latency), wherein the "Switching-Node-" corresponds to the POP. In addition, the mapping system also knows the latencies from the switching (intermediary) nodes themselves, as depicted in data table 1604.

Now, consider the situation where data table 1600 (the connector-to-origin latencies) is not present in the mapping system. In this embodiment, and with reference back to FIG. 15, when the connection request from client 1506 is received at node 1508, the mapping system would likely route to the closest apparent connector (in this case 1512) from that node because (in this embodiment the mapping system) is blind to the last hop latency; the mapping system would then hairpin the connection to the truly-closest connector (in this case 1514). This hairpin route is depicted by dotted line through the site-to-site MPLS connection. More specifically, without the last hop latency data, the mapping system would add up the path costs and choose the path Switching-Node-1 to Switching-Node-2 to Connector-2 because its overall cost is just 42 milliseconds, namely: 22 milliseconds (Switching-Node-1, Switching-Node-2)+20 milliseconds (Switching-Node-2, Connector-2). In this example, Switching-Node-1 corresponds to intermediary node 1508, Switching-Node-2 corresponds to intermediary node 1510, and Connector-2 corresponds to connector 1512. This path would be selected over, say, the path Switching-Node-1 to Switching-Node-4 (1514) to Connector-1 (1516), whose apparent cost would be 80 milliseconds, namely: 60 milliseconds (Switching-Node-1, Switching-Node-4)+20 (Switching-Node-4, Connector 1). The path (scoring as 42 milliseconds) looks less expensive than the second path (scoring as 80 milliseconds).

But, when the mapping system factors in the connector-to-origin path cost using the data in table 1600, a different result occurs. In considering the costs between the candidate full paths referenced above, the true cost are then computed as follows:

| Switching-Node-1 to Switching Node-2 to Connector-2 to Origin X (1501 in 1500): |
| --- |
| Cost(Switching-Node-1, Switching-Node-2) + Cost(Switching-Node-2, Connector-2) + Cost(Connector-2, Origin-X) (22 + 20 + 81) = 123 milliseconds |

13

| Switching-Node-1 to Switching Node-4 to Connector-1 to Origin X: |
|---|
| Cost(Switching-Node-1, Switching-Node-4) + Cost(Switching-Node-4, Connector-1) + Cost(Connector-4, Origin-X) (60 + 20 +3) = 83 milliseconds |

When the connection-to-origin data is included in the computations, the second path looks less expensive than the first path that is the correct choice. The location service in its interoperations with the mapping system cause the connection request to be routed along the alternative route as depicted.

Thus, and according to this variant embodiment, when data centers supporting the enterprise internal applications (the origins) inside the firewall are interconnected in whole or in part, collectors also generate and report back (to the mapping system) connector-to-origin latency data, and that latency data is used during the mapping process when routing to origins behind a firewall. The particular algorithms being used by the mapping process may vary, and they may include shortest path algorithms, such as Djikstra's algorithm, Bellman-Ford algorithm, and others. The approach herein enables the mapping system to perform full-path routing by leveraging connector-to-origin ping scores and provides significant improvements for the situation where a connector is in a network that has site-to-site connectivity and thus can reach origin instances that are actually far away from the connector's actual location. In the use case where a connector in such a network, the approach ensures that the mapping system does not merely steer a connection to an intermediary (switching) node that is close to a serviceable connector but that might not actually offer the best direct path to the origin.

The above-described solution also provides the above-described full path routing advantages when the connector functionality is supported in a VPN concentrator.

While the above technique provides significant advantages in the context of the described connector-based embodiment, this is not a limitation, as the approach may be used in association with any mapping system that seeks to establish a path through a graph of connected nodes, some of which are split behind a horizon in which their edge scores are generally unknown.

Enabling Technologies

As noted above, the techniques of this disclosure may be implemented within the context of an overlay network, such as a content delivery network (CDN), although this is not a limitation. In a known system of this type, a distributed computer system is configured as a content delivery network (CDN) and is assumed to have a set of machines distributed around the Internet. Typically, most of the machines are servers located near the edge of the Internet, i.e., at or adjacent end user access networks. A network operations command center (NOCC) manages operations of the various machines in the system. Third party sites offload delivery of content (e.g., HTML, embedded page objects, streaming media, software downloads, web applications, and the like) to the distributed computer system and, in particular, to "edge" servers. Typically, content providers offload their content delivery by aliasing (e.g., by a DNS CNAME) given content provider domains or sub-domains to domains that are managed by the service provider's authoritative domain name service. End users that desire the content are directed to the distributed computer system to obtain that content more reliably and efficiently. The distributed computer system may also include other infrastructure, such as a distributed data collection system that collects usage and other data from the edge servers, aggregates that data across a region or set of regions, and passes that data to other back-end systems to facilitate monitoring, logging, alerts, billing, management and other operational and administrative functions. Distributed network agents monitor the network as well as the server loads and provide network, traffic and load data to a DNS query handling mechanism (the mapping system), which is authoritative for content domains being managed by the CDN. A distributed data transport mechanism may be used to distribute control information (e.g., metadata to manage content, to facilitate load balancing, and the like) to the edge servers.

A given machine in the CDN comprises commodity hardware running an operating system kernel (such as Linux or variant) that supports one or more applications. For example, and to facilitate content delivery services, for example, given machines typically run a set of applications, such as an HTTP proxy (sometimes referred to as a "global host" process), a name server, a local monitoring process, a distributed data collection process, and the like. Using this machine, a CDN edge server is configured to provide one or more extended content delivery features, preferably on a domain-specific, customer-specific basis, preferably using configuration files that are distributed to the edge servers using a configuration system. A given configuration file preferably is XML-based and includes a set of content handling rules and directives that facilitate one or more advanced content handling features. The configuration file may be delivered to the CDN edge server via the data transport mechanism. U.S. Pat. No. 7,111,057 illustrates a useful infrastructure for delivering and managing edge server content control information, and this and other edge server control information can be provisioned by the CDN service provider itself, or (via an extranet or the like) the content provider customer who operates the origin server.

The CDN may include a storage subsystem, such as described in U.S. Pat. No. 7,472,178, the disclosure of which is incorporated herein by reference. The CDN may operate a server cache hierarchy to provide intermediate caching of customer content; one such cache hierarchy subsystem is described in U.S. Pat. No. 7,376,716, the disclosure of which is incorporated herein by reference. The CDN may provide secure content delivery among a client browser, edge server and customer origin server in the manner described in U.S. Publication No. 20040093419. Secure content delivery as described therein enforces SSL-based links between the client and the edge server process, on the one hand, and between the edge server process and an origin server process, on the other hand. This enables an SSL-protected web page and/or components thereof to be delivered via the edge server. To enhance security, the service provider may provide additional security associated with the edge servers. This may include operating secure edge regions comprising edge servers located in locked cages that are monitored by security cameras.

More generally, the techniques described herein are provided using a set of one or more computing-related entities (systems, machines, processes, programs, libraries, functions, or the like) that together facilitate or provide the described functionality described above. In a typical implementation, a representative machine on which the software executes comprises commodity hardware, an operating system, an application runtime environment, and a set of applications or processes and associated data, that provide the functionality of a given system or subsystem. As described, the functionality may be implemented in a stand-alone machine, or across a distributed set of machines. The functionality may be provided as a service, e.g., as a SaaS solution.

There is no limitation on the type of machine or computing entity that may implement the end user machine and its related function herein. Any computing entity (system, machine, device, program, process, utility, or the like) may act as the client or the server. There is no limitation on the type of computing entity that may implement the function. The function may be implemented within or in association with other systems, equipment and facilities.

Typically, but without limitation, a client device is a mobile device, such as a smartphone, tablet, or wearable computing device. Such a device comprises a CPU (central processing unit), computer memory, such as RAM, and a drive. The device software includes an operating system (e.g., Google® Android™, or the like), and generic support applications and utilities. The device may also include a graphics processing unit (GPU).

As noted, the location service may execute in a cloud environment. As is well-known, cloud computing is a model of service delivery for enabling on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. Available services models that may be leveraged in whole or in part include: Software as a Service (SaaS) (the provider's applications running on cloud infrastructure); Platform as a service (PaaS) (the customer deploys applications that may be created using provider tools onto the cloud infrastructure); Infrastructure as a Service (IaaS) (customer provisions its own processing, storage, networks and other computing resources and can deploy and run operating systems and applications).

A cloud computing platform may comprise co-located hardware and software resources, or resources that are physically, logically, virtually and/or geographically distinct. Communication networks used to communicate to and from the platform services may be packet-based, non-packet based, and secure or non-secure, or some combination thereof.

More generally, the techniques described herein are provided using a set of one or more computing-related entities (systems, machines, processes, programs, libraries, functions, or the like) that together facilitate or provide the described functionality described above. In a typical implementation, a representative machine on which the software executes comprises commodity hardware, an operating system, an application runtime environment, and a set of applications or processes and associated data, that provide the functionality of a given system or subsystem. As described, the functionality may be implemented in a stand-alone machine, or across a distributed set of machines.

Each above-described process preferably is implemented in computer software as a set of program instructions executable in one or more processors, as a special-purpose machine.

One or more functions herein described may be carried out as a "service." The service may be carried out as an adjunct or in association with some other services, such as by a CDN, a cloud provider, or some other such service provider.

While given components of the system have been described separately, one of ordinary skill will appreciate that some of the functions may be combined or shared in given instructions, program sequences, code portions, and the like. Any application or functionality described herein may be implemented as native code, by providing hooks into another application, by facilitating use of the mechanism as a plug-in, by linking to the mechanism, and the like.

The technique herein of capturing and using connector-to-origin latency data may be implemented irrespective of the mechanism (such as MLPS) that is used to facilitate the site-to-site behind-the-firewall connectivity.

What is claimed is as follows:

1. A method of connection routing in an overlay network accessible to multiple tenants, wherein a tenant has an associated enterprise application that resides in multiple private geo-locations, the multiple private geo-locations being interconnected in a site-to-site manner, the overlay network comprising a set of intermediary nodes, and a mapping service, comprising:

configuring a connector in each private geo-location, wherein the connector has connectivity to the enterprise application in the private geo-location in which the connector is configured, and to the enterprise application residing in at least one other private geo-location to which the connector can access via site-to-site interconnections;

receiving information from each connector, the information comprising a public IP address of a device associated with the connector, a set of internal IP addresses reachable within the geo-location from the connector, and a measurement of the connector's relative connectivity to the enterprise application that resides in the multiple private geo-locations;

responsive to receipt of a connection request from a client that is directed to the enterprise application, using the information received from the connectors to identify a path to a particular connector in a given private geo-location to handle the connection request;

interoperating with the mapping service to cause the connection request to be forwarded across one or more intermediary nodes to the particular connector; and using the particular connector to establish an end-to-end connection between the client and the enterprise application.

2. The method as described in claim 1, wherein the measurement of the connector's relative connectivity to the enterprise application is obtained from a network traffic test.

3. The method as described in claim 2 wherein the network traffic test is a ping.

4. The method as described in claim 3 further including periodically initiating the ping to obtain a round trip time (RTT) from the connector to each instance of the enterprise application that is reachable via the site-to-site interconnections.

5. The method as described in claim 1, wherein the information is received by the mapping service.

6. The method as described in claim 5, wherein the mapping service uses the measurements of the connector's relative connectivity to each instance of the enterprise application that is reachable via the site-to-site interconnections in a shortest path algorithm.

7. The method as described in claim 1, wherein the overlay network provides the multiple tenants with a Zero Trust Network Access (ZTNA) service.

8. The method as described in claim 1, wherein the intermediary nodes are associated with the service provider.

9. The method as described in claim 1 wherein the site-to-site interconnections are via Multi-Protocol Label Switching (MPLS).

10. An apparatus, comprising:

a processor;

computer memory storing computer program instructions configured to provide connection routing in an overlay network accessible to multiple tenants, wherein a tenant has an associated enterprise application that resides in multiple private geo-locations, the multiple private geo-locations being interconnected in a site-to-site manner, each private geo-location having a connector cnfigured therein that has connectivity to (i) the enterprise application in the private geo-location in which the connector is configured, and (ii) to the enterprise application in at least one other private geo-location to which the connector can access via site-to-site interconnections, the overlay network comprising a set of intermediary nodes, and a mapping service, the computer program instructions comprising program code configured to:

receive information from each connector, the information comprising a public IP address of a device associated with the connector, a set of internal IP addresses reachable within the geo-location from the connector, and a measurement of the connector's relative connectivity to the enterprise application that resides in the multiple private geo-locations;

responsive to receipt of a connection request from a client that is directed to the enterprise application, use the information received from the connectors to identify a path to a particular connector in a given private geo-location to handle the connection request;

interoperate with the mapping service to cause the connection request to be forwarded across one or more intermediary nodes to the particular connector; and control the particular connector to establish an end-to-end connection between the client and the enterprise application.

11. The apparatus as described in claim 10, wherein measurement of the connector's relative connectivity to the enterprise application is obtained from a network traffic test.

12. The apparatus as described in claim 11 wherein the network traffic test is a ping.

13. The apparatus as described in claim 12 wherein the program code is configured to periodically initiate the ping to obtain a round trip time (RTT) from the connector to each instance of the enterprise application that is reachable via the site-to-site interconnections.

14. The apparatus as described in claim 10, wherein the overlay network provides the multiple tenants with a Zero Trust Network Access (ZTNA) service.

15. A computer program product in a non-transitory computer-readable medium, the computer program product comprising computer program instructions configured as program code and executable in one or more hardware processors to provide connection routing in an overlay network accessible to multiple tenants, wherein a tenant has an associated enterprise application that resides in multiple private geo-locations, the multiple private geo-locations being interconnected in a site-to-site manner, the overlay network comprising a set of intermediary nodes, and a mapping service, the program code comprising:

a connector configured in each private geo-location, wherein the connector has connectivity to the enterprise application in the private geo-location in which the connector is configured, and to the enterprise application residing in at least one other private geo-location to which the connector can access via site-to-site interconnections; and a location service, the location service configured to:

receive information from each connector, the information comprising a public IP address of a device associated with the connector, a set of internal IP addresses reachable within the geo-location from the connector, and a measurement of the connector's relative connectivity to the enterprise application that resides in the multiple private geo-locations;

responsive to receipt of a connection request from a client that is directed to the enterprise application, use the information received from the connectors to identify a path to a particular connector in a given private geo-location to handle the connection request;

interoperate with the mapping service to cause the connection request to be forwarded across one or more intermediary nodes to the particular connector; and control the particular connector to establish an end-to-end connection between the client and the enterprise application.

16. The computer program product as described in claim 15, wherein the measurement of the connector's relative connectivity to the enterprise application is obtained from a network traffic test.

17. The computer program product as described in claim 16 wherein the network traffic test is a ping.

18. The computer program product as described in claim 15 wherein the program code is configured to periodically initiate the ping to obtain a round trip time (RTT) from the connector to each instance of the enterprise application that is reachable via the site-to-site interconnections.

19. The computer program product as described in claim 16, wherein the overlay network provides the multiple tenants with a Zero Trust Network Access (ZTNA) service.

* * * * *